(12) United States Patent
Ogawa (10) Patent No.: US 11,799,624 B2
(45) Date of Patent: Oct. 24, 2023

(54) TIME-SYNCHRONIZATION SYSTEM, RELAY APPARATUS, TIME-SYNCHRONIZATION METHOD, AND NON-TRANSITORY COMPUTER READABLE MEDIUM

(71) Applicant: NEC Corporation, Tokyo (JP)

(72) Inventor: Takatoshi Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 215 days.

(21) Appl. No.: 17/598,413

(22) PCT Filed: Mar. 2, 2020

(86) PCT No.: PCT/JP2020/008634
§ 371 (c)(1),
(2) Date: Sep. 27, 2021

(87) PCT Pub. No.: WO2020/195573
PCT Pub. Date: Oct. 1, 2020

(65) Prior Publication Data
US 2022/0182214 A1    Jun. 9, 2022

(30) Foreign Application Priority Data
Mar. 28, 2019    (JP) .................. 2019-064688

(51) Int. Cl.
*H04L 7/00* (2006.01)
*H04J 3/06* (2006.01)
*H04L 12/28* (2006.01)

(52) U.S. Cl.
CPC .............. *H04L 7/0016* (2013.01); *H04J 3/06* (2013.01); *H04L 7/0054* (2013.01); *H04L 12/28* (2013.01)

(58) Field of Classification Search
None
See application file for complete search history.

(56) References Cited

U.S. PATENT DOCUMENTS 9,204,408 B2 * 12/2015 Hirota .............. H04B 7/155
2015/0180641 A1    6/2015 Ogawa
2017/0302392 A1 * 10/2017 Farra .............. H04J 14/021

FOREIGN PATENT DOCUMENTS

JP    2016-152488 A    8/2016
JP    2017-059730 A    3/2017
(Continued)

OTHER PUBLICATIONS

International Search Report for PCT Application No. PCT/JP2020/008634, dated Mar. 24, 2020.

*Primary Examiner* — Gerald A Smarth (57) ABSTRACT

A time-synchronization system according to the present disclosure includes a relay apparatus (10) configured to perform time-synchronization with a master apparatus (30) through a transmission system of which a transmission delay changes depending on a transmission direction, and a relay apparatus (20) configured to perform time-synchronization with the relay apparatus (10), in which the relay apparatus (20) transmits information about a difference between first time information obtained by performing time-synchronization with the relay apparatus (10) and second time information obtained from a time-synchronization source to the relay apparatus (10), and the relay apparatus (10) corrects third time information obtained by performing time-synchronization with the master apparatus (30) by using the information about the difference, and performs time-synchronization with a slave apparatus (50) by using the corrected third time information.

8 Claims, 9 Drawing Sheets

(56) References Cited

FOREIGN PATENT DOCUMENTS

| | | | |
|---|---|---|---|
| JP | 2018-207238 A | 12/2018 | |
| WO | WO-2005088865 A1 * | 9/2005 | ........... H04B 7/2125 |
| WO | WO-2011029310 A1 * | 3/2011 | ............ H04J 3/0673 |
| WO | WO-2011144263 A1 * | 11/2011 | ............ H04J 3/0673 |
| WO | 2014/016993 A1 | 1/2014 | |

* cited by examiner

TIME-SYNCHRONIZATION SYSTEM, RELAY APPARATUS, TIME-SYNCHRONIZATION METHOD, AND NON-TRANSITORY COMPUTER READABLE MEDIUM

This application is a National Stage Entry of PCT/JP2020/008634 filed on Mar. 2, 2020, which claims priority from Japanese Patent Application 2019-064688 filed on Mar. 28, 2019, the contents of all of which are incorporated herein by reference, in their entirety.

TECHNICAL FIELD

The present invention relates to a time-synchronization system, a relay apparatus, a time-synchronization method, and a program.

BACKGROUND ART

In general, accuracy of several microseconds or shorter is required for the synchronization of time in a base station for mobile communication. Therefore, a time-synchronization system such as GNSS (Global Navigation Satellite System) is used. Further, for the synchronization of time, an IEEE (The Institute of Electrical and Electronics Engineers, Inc.) 1588 or the like in which a method for synchronizing a device located on a network with accuracy of microseconds or shorter is specified can also be used.

Patent Literature 1 discloses a configuration of a time-synchronization system using a PTP (Precision Time Protocol). Further, Patent Literature 1 discloses a configuration of a base-station system including REC (Radio Equipment Control) which operates as a boundary clock. The REC operates as a slave apparatus of the PTP when it performs time-synchronization with a master apparatus of the PTP, and operates as a master apparatus of the PTP when it performs time-synchronization with other RECs. The REC operating as a boundary clock transmits a PTP packet and delay information to the other REC. The other REC generates PTP time information by using the received PTP packet and the delay information.

CITATION LIST

Patent Literature

Patent Literature 1: Japanese Unexamined Patent Application Publication No. 2017-050730

SUMMARY OF INVENTION

Technical Problem

However, in the REC operating as a boundary clock disclosed in Patent Literature 1, there is a problem that when an asymmetric delay occurs in a transmission line, the REC cannot send accurate delay information to the other REC.

In general, in the synchronization of time using the PTP, a half of a delay time in a round trip between a master apparatus and a slave apparatus is used as a delay time for the correction of time. In the case where an asymmetric delay occurs in a transmission line, if the REC transmits a time equivalent to a half of the delay time in a round trip to the other REC as the delay time for the correction, the other REC corrects the time by using the inaccurate delay time. Therefore, it has been desired to improve the accuracy of the synchronization of time in the cases in which an asymmetric delay occurs in a transmission line.

An object of the present disclosure is to provide a time-synchronization system, a relay apparatus, a time-synchronization method, and a program capable of improving the accuracy of the synchronization of time in the cases in which an asymmetric delay occurs in a transmission line.

Solution to Problem

A time-synchronization system according to a first aspect of the present disclosure includes: a first relay apparatus configured to perform time-synchronization with a master apparatus through a transmission system of which a transmission delay changes depending on a transmission direction; and a second relay apparatus configured to perform time-synchronization with the first relay apparatus, in which the second relay apparatus transmits information about a difference between first time information obtained by performing time-synchronization with the first relay apparatus and second time information obtained from a time-synchronization source to the first relay apparatus, and the first relay apparatus corrects third time information obtained by performing time-synchronization with the master apparatus by using the information about the difference, and performs time-synchronization with a slave apparatus by using the corrected third time information.

A relay apparatus according to a second aspect of the present disclosure includes: a time-synchronization unit configured to perform time-synchronization with a first relay apparatus, the first relay apparatus being configured to perform time-synchronization with a master apparatus through a transmission system of which a transmission delay changes depending on a transmission direction; and a difference-information generation unit configured to generate information about a difference between first time information obtained by performing time-synchronization with the first relay apparatus and second time information obtained from a time-synchronization source, in which the time-synchronization unit transmits the information about the difference to the first relay apparatus in order to make the first relay apparatus correct third time information obtained by performing time-synchronization with the master apparatus in the first relay apparatus.

A time-synchronization method according to a third aspect of the present disclosure includes: performing time-synchronization with a first relay apparatus, the first relay apparatus being configured to perform time-synchronization with a master apparatus through a transmission system of which a transmission delay changes depending on a transmission direction; generating information about a difference between first time information obtained by performing time-synchronization with the first relay apparatus and second time information obtained from a time-synchronization source; and transmitting the information about the difference to the first relay apparatus in order to make the first relay apparatus correct third time information obtained by performing time-synchronization with the master apparatus in the first relay apparatus.

Advantageous Effects of Invention

According to the present disclosure, it is possible to provide a time-synchronization system, a relay apparatus, a time-synchronization method, and a program capable of improving the accuracy of the synchronization of time in cases in which an asymmetric delay occurs in a transmission line.

DESCRIPTION OF EMBODIMENTS

First Example Embodiment

Example embodiments according to the present invention will be described hereinafter with reference to the drawings. An example of a configuration of a time-synchronization system according to a first example embodiment will be described with reference to FIG. 1. The time-synchronization system shown in FIG. 1 includes a relay apparatus 10, a relay apparatus 20, a master apparatus 30, a time-synchronization source 40, and a slave apparatus 50. Each of the relay apparatus 10, the relay apparatus 20, the master apparatus 30, the time-synchronization source 40, and the slave apparatus 50 may be a computer apparatus that operates as a processor executes a program stored in a memory.

Figure 1:
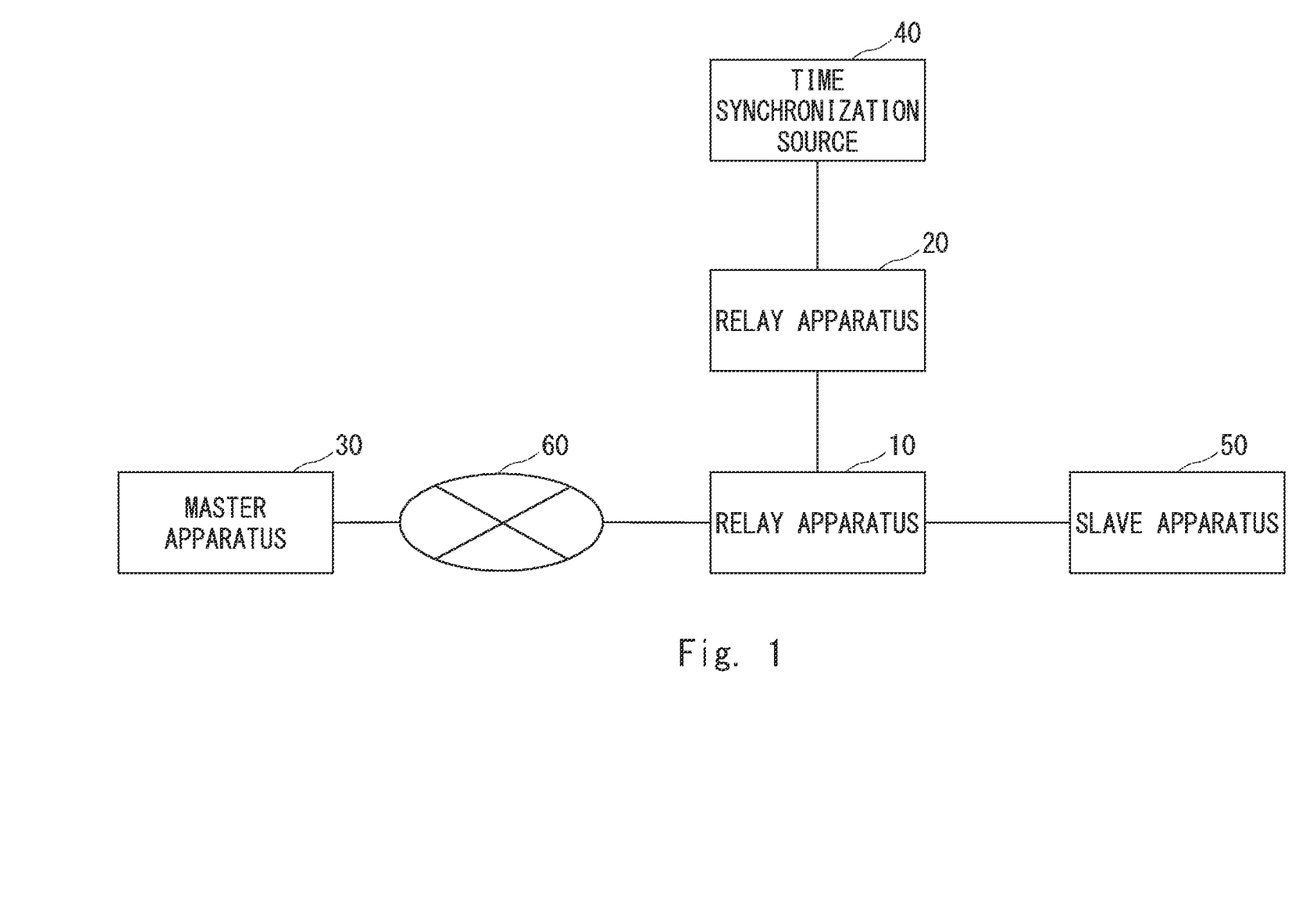
FIG. 1 is a diagram showing a configuration of a time-synchronization system according to a first example embodiment.

The relay apparatus 10 performs time-synchronization with the master apparatus 30 through a transmission system 60 of which the transmission delay changes depending on the transmission direction. The fact that the transmission delay changes depending on the transmission direction may be, for example, a fact that the transmission delay of data transmitted from the master apparatus 30 to the relay apparatus 10 differs from the transmission delay of data transmitted from the relay apparatus 10 to the master apparatus 30. For example, when a path of data transmitted from the master apparatus 30 to the relay apparatus 10 differs from a path of data transmitted from the relay apparatus 10 to the master apparatus 30, the transmission delays of these paths differ from each other. When paths differ from each other, the numbers of communication apparatuses which data passes through when it is transmitted through these paths differ from each other, so that the transmission delays in these paths also differ from each other. In the transmission system 60, the factors due to which the transmission delay changes depending on the transmission direction are not limited to those in the case in which a different path is selected depending on the transmission direction. For example, it may be a case in which although the same transmission path is used in both directions, an asymmetric delay occurs, i.e., the communication speeds in the uplink and downlink differ from each other as in the case of the ADSL (Asymmetric Digital Subscriber Line).

The relay apparatus 10 may perform, for example, time-synchronization with the master apparatus 30 by using the PTP. In this case, the relay apparatus 10 operates as a PTP slave, and the master apparatus 30 operates as a PTP master.

An overview of a time-synchronization process using the PTP will be described hereinafter. The master apparatus 30 transmits a synchronization packet including a time T1 to the relay apparatus 10 through the transmission system 60. The time T1 is a time at which the master apparatus 30 transmitted the synchronization packet. The time T1 is a time that is determined based on a clock or the like managed by the master apparatus 30. The master apparatus 30 may determine the time, for example, by receiving time information, a timing pulse, a clock, or the like from a time-synchronization source. In the following description, it is assumed that the time information indicates time information, a timing pulse, a clock, or the like. The relay apparatus 10 calculates a transmission delay time T2−T1 of the synchronization packet by using the time T1 included in the synchronization packet and a time T2 at which the relay apparatus 10 received the synchronization packet. The time T2 is a time that is determined based on a clock or the like managed by the relay apparatus 10.

Further, the relay apparatus 10 transmits a synchronization packet including a time T3 to the master apparatus 30. The time T3 is a time at which the relay apparatus 10 transmitted the synchronization packet. The master apparatus 30 calculates a transmission delay time T4−T3 of the synchronization packet by using the time T3 included in the synchronization packet and a time T4 at which the master apparatus 30 received the synchronization packet. Further, the relay apparatus 10 includes (i.e., adds) information about the transmission delay time T2−T1 in the synchronization packet.

The master apparatus 30 calculates a one-way transmission delay "D={(T4−T3)+(T2−T1)}/2" between the master apparatus 30 and the relay apparatus 10. The master apparatus 30 transmits information about the one-way transmission delay D to the relay apparatus 10.

The relay apparatus 10 synchronizes its time with that of the master apparatus 30 by adding the one-way transmission delay D to the time included in the synchronization packet transmitted from the master apparatus 30. It is assumed that the time of the master apparatus 30 is an accurate time that has been synchronized with the time of other time-synchronization sources or the like.

Note that the one-way transmission delay D has a value equivalent to a half of the round-trip transmission delay between the master apparatus 30 and the relay apparatus 10. Therefore, when the transmission delay of the synchronization packet transmitted from the master apparatus 30 to the relay apparatus 10 differs from the transmission delay of the synchronization packet transmitted from the relay apparatus 10 to the master apparatus 30, the one-way transmission delay D differs from the actual value thereof. That is, the transmission delay of the synchronization packet transmitted from the master apparatus 30 to the relay apparatus 10 differs from the one-way transmission delay D. Therefore, the relay apparatus 10 cannot accurately perform time-synchronization with the master apparatus 30.

The relay apparatus 20 performs time-synchronization with the relay apparatus 10. The relay apparatus 20 may perform, for example, time-synchronization with the relay apparatus 10 by using the PTP. In this case, the relay apparatus 20 operates as a PTP slave, and the relay apparatus 10 operates as a PTP master. That is, the relay apparatus 20 synchronizes its time with that of the relay apparatus 10.

Further, the relay apparatus 20 transmits, to the relay apparatus 10, information about a difference between time information A1 obtained by performing time-synchronization with the relay apparatus 10 and time information A2 obtained from the time-synchronization source 40.

Note that since the relay apparatus 10 has performed time-synchronization with the master apparatus 30 by using the one-way transmission delay D which is different from the actually-occurring transmission delay, there is a difference from the actual time. Further, since the relay apparatus 20 has performed time-synchronization with the relay apparatus 10, the time information A1 in the relay apparatus 20 also differs from the actual time. Meanwhile, the time information A2 obtained from the time-synchronization source 40 is regarded as an accurate time. That is, it is assumed that the time information A2 obtained from the time-synchronization source 40 substantially coincides with the time in the master apparatus 30.

Therefore, it is considered that the information about the difference between the time information A2 and the time information A1 indicates the difference between the time information in the relay apparatus 10 and that in the master apparatus 30.

The relay apparatus 10 corrects the time information A3 obtained by performing time-synchronization with the master apparatus 30 by using the information about the difference (hereinafter also referred to as difference information) received from the relay apparatus 20. Further, the relay apparatus 10 transmits the corrected time information A3 to the slave apparatus 50. The relay apparatus 10 performs time-synchronization with the relay apparatus 10 by using the corrected time information A3 according to the PTP. That is, the slave apparatus 50 sets its time to the corrected time information A3.

The time information A3 is obtained as the relay apparatus 10 performs time-synchronization with the master apparatus 30 by using the one-way transmission delay D. That is, the time information A3 includes a deviation of time caused by a difference between the transmission delay of the synchronization packet transmitted from the master apparatus 30 to the relay apparatus 10 and the transmission delay of the synchronization packet transmitted from the relay apparatus 10 to the master apparatus 30. Therefore, the relay apparatus 10 corrects the time information A3 by using the difference information received from the relay apparatus 20, so that the corrected time information A3 has a value that is accurately synchronized with the time of the master apparatus 30.

As described above, in the time-synchronization system shown in FIG. 1, the relay apparatus 20 can detect a difference between time information that is generated as a result of the time-synchronization between the relay apparatus 10 and the master apparatus 30 through the transmission system 60 of which the transmission delay changes depending on the transmission direction, and the accurate time information. Further, the relay apparatus 20 transmits information about a difference between time information obtained as a result of the time-synchronization with the relay apparatus 10 and the accurate time information to the relay apparatus 10. The relay apparatus 10 can correct the time information by using the information received from the relay apparatus 20. As a result, the relay apparatus 10 can correct the deviation from the accurate time information which is caused as a result of the time-synchronization performed with the master apparatus 30 through the transmission system 60.

Second Example Embodiment

Figure 2:
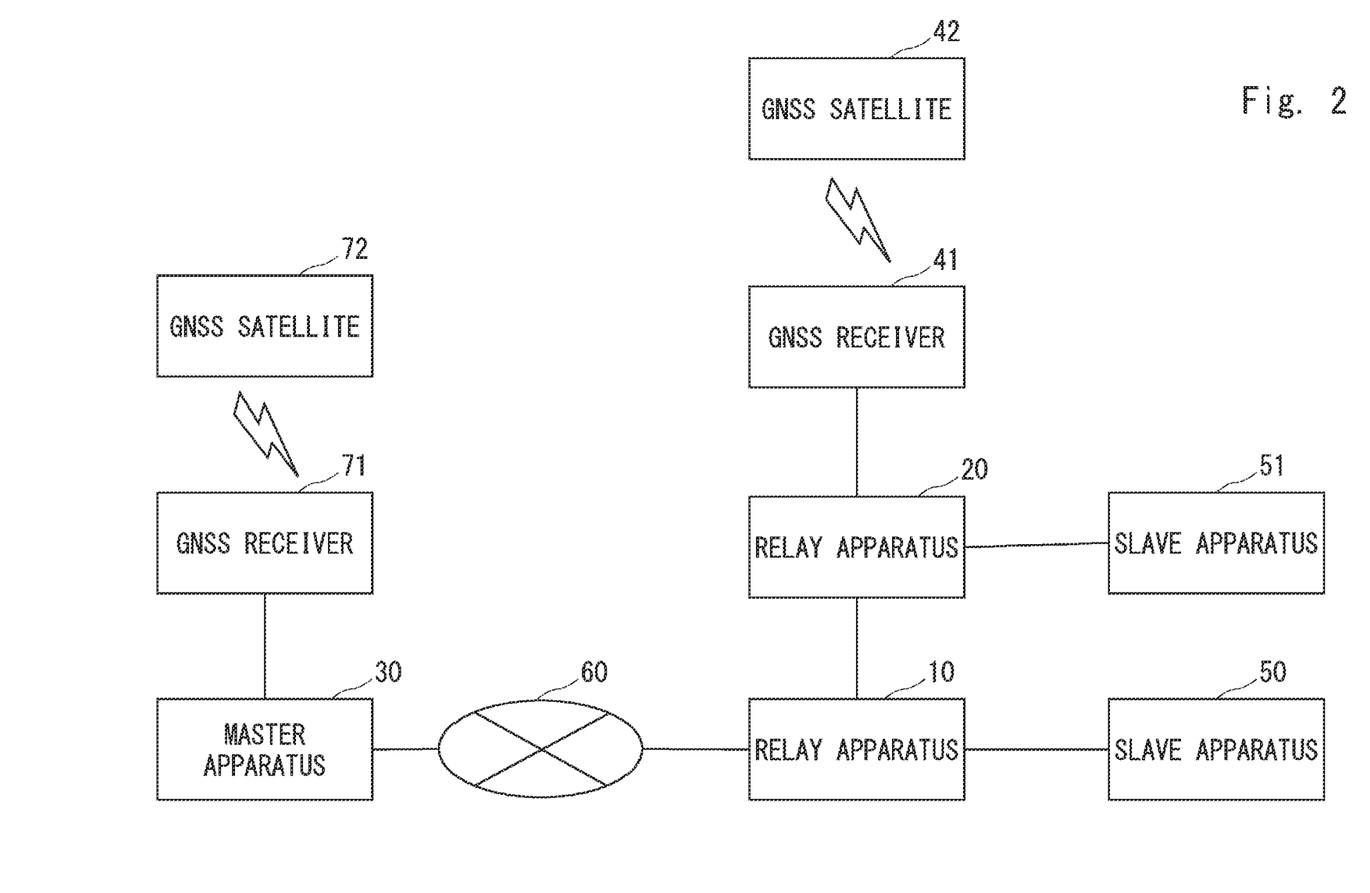
FIG. 2 is a diagram showing a configuration of a time-synchronization system according to a second example embodiment.

Next, an example of a configuration of a time-synchronization system according to a second example embodiment will be described with reference to FIG. 2. The time-synchronization system shown in FIG. 2 is obtained by adding a GNSS receiver 71, a GNSS satellite 72, and a slave apparatus 51 in the time-synchronization system shown in FIG. 1. Further, in the time-synchronization system shown in FIG. 2, a GNSS receiver 41 and a GNSS satellite 42 are used in place of the time-synchronization source 40 shown in FIG. 1. In the time-synchronization system shown in FIG. 2, the detailed description of a configuration similar to that of the time-synchronization system shown in FIG. 1 is omitted. Further, the relay apparatus 10 and the relay apparatus 20 in the time-synchronization system shown in FIG. 2 operate as a boundary clock apparatus.

The GNSS receiver 71 receives a signal from the GNSS satellite 72. The GNSS receiver 71 transmits time information to the master apparatus 30 based on the received signal. The GNSS receiver 41 receives a signal from the GNSS satellite 42. The GNSS receiver 41 transmits information about a time to the relay apparatus 20 based on the received signal. That is, the master apparatus 30 and the relay apparatus 20 have accurate times based on the satellite positioning systems using the GNSS satellite 72 and the GNSS satellite 42, respectively. The GNSS receiver 71 may be formed, for example, as an integrated apparatus with the master apparatus 30, and the GNSS receiver 41 may be formed as an integral apparatus with the relay apparatus 20.

A publicly-known technique may be used for the GNSS satellite 72 and the GNSS satellite 42 as long as they can provide the reference time, and therefore detailed descriptions thereof will be omitted. As the GNSS satellite 72 and the GNSS satellite 42, for example, a time-synchronization system such as GPS (Global Positioning System), Galileo (Galileo (positioning system)), GLONASS (Global Navigation Satellite System), and Beidou (BeiDou Navigation Satellite System) may be used.

Further, the slave apparatus 51 synchronizes its time with that of the relay apparatus 20.

Figure 3:
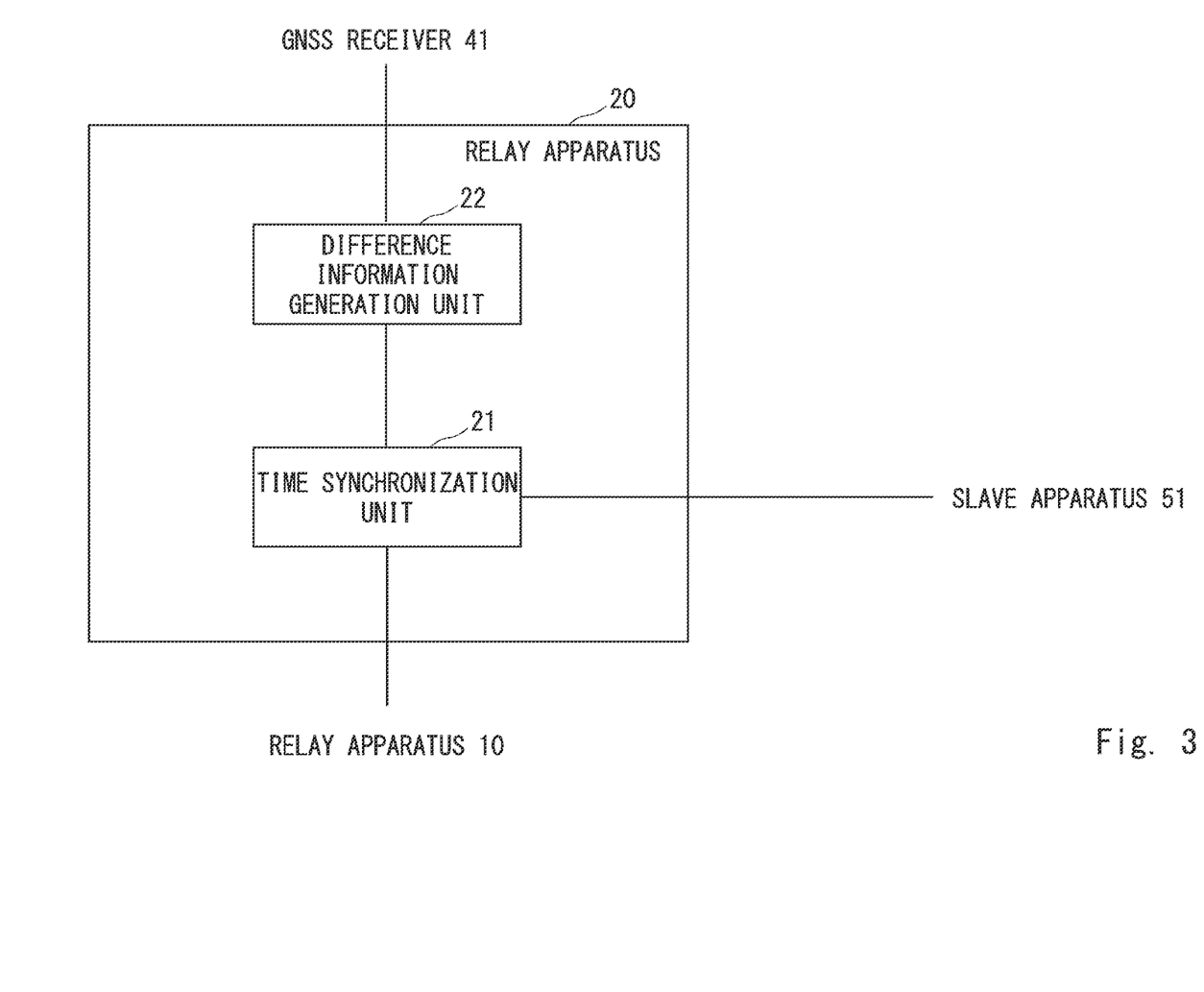
FIG. 3 is a diagram showing a configuration of a relay apparatus according to the second example embodiment.

Next, an example of a configuration of the relay apparatus 20 will be described with reference to FIG. 3. The relay apparatus 20 includes a time-synchronization unit 21 and a difference-information generation unit 22. Each of the time-synchronization unit 21 and the difference-information generation unit 22 may be software or a module by which processing is performed as a processor executes a program stored in a memory. Alternatively, each of the time-synchronization unit 21 and the difference-information generation unit 22 may be hardware such as a circuit or a chip.

The time-synchronization unit 21 performs time-synchronization with the relay apparatus 10. For example, the time-synchronization unit 21 operates as a PTP slave, and the relay apparatus 10 operates as a PTP master. Note that the relay apparatus 10 performs time-synchronization with the master apparatus 30 through the transmission system 60 of which the transmission delay changes depending on the transmission direction. Therefore, the time held by the relay apparatus 10 is deviated from the time of the master apparatus 30 which indicates the accurate time. As a result, the time that is obtained as the time-synchronization unit 21 performs time-synchronization with the relay apparatus 10 also has a deviation from the accurate time as in the case of the time of the relay apparatus 10. The time-synchronization unit 21 outputs time information obtained by performing time-synchronization with the relay apparatus 10 to the difference-information generation unit 22.

The difference-information generation unit 22 acquires time information from the GNSS receiver 41. The time information acquired by the difference-information generation unit 22 indicates an accurate time based on the satellite positioning system. The difference-information generation unit 22 generates a difference between the time information acquired from the GNSS receiver 41 and the time information acquired from the time-synchronization unit 21. The difference-information generation unit 22 outputs information about the generated difference to the time-synchronization unit 21.

The time-synchronization unit 21 corrects the time information acquired by performing time-synchronization with the relay apparatus 10 by using the information about the difference (hereinafter also referred to as difference information) acquired from the difference-information generation unit 22. The time-synchronization unit 21 transmits the corrected time to the slave apparatus 51 and thereby performs time-synchronization with the slave apparatus 51. That is, the slave apparatus 51 synchronizes with the corrected time information in the relay apparatus 20. The time-synchronization unit 21 operates as a PTP master, and the slave apparatus 51 operates as a PTP slave.

The time-synchronization unit 21 transmits the difference information acquired from the difference-information generation unit 22 to the relay apparatus 10.

Figure 4:
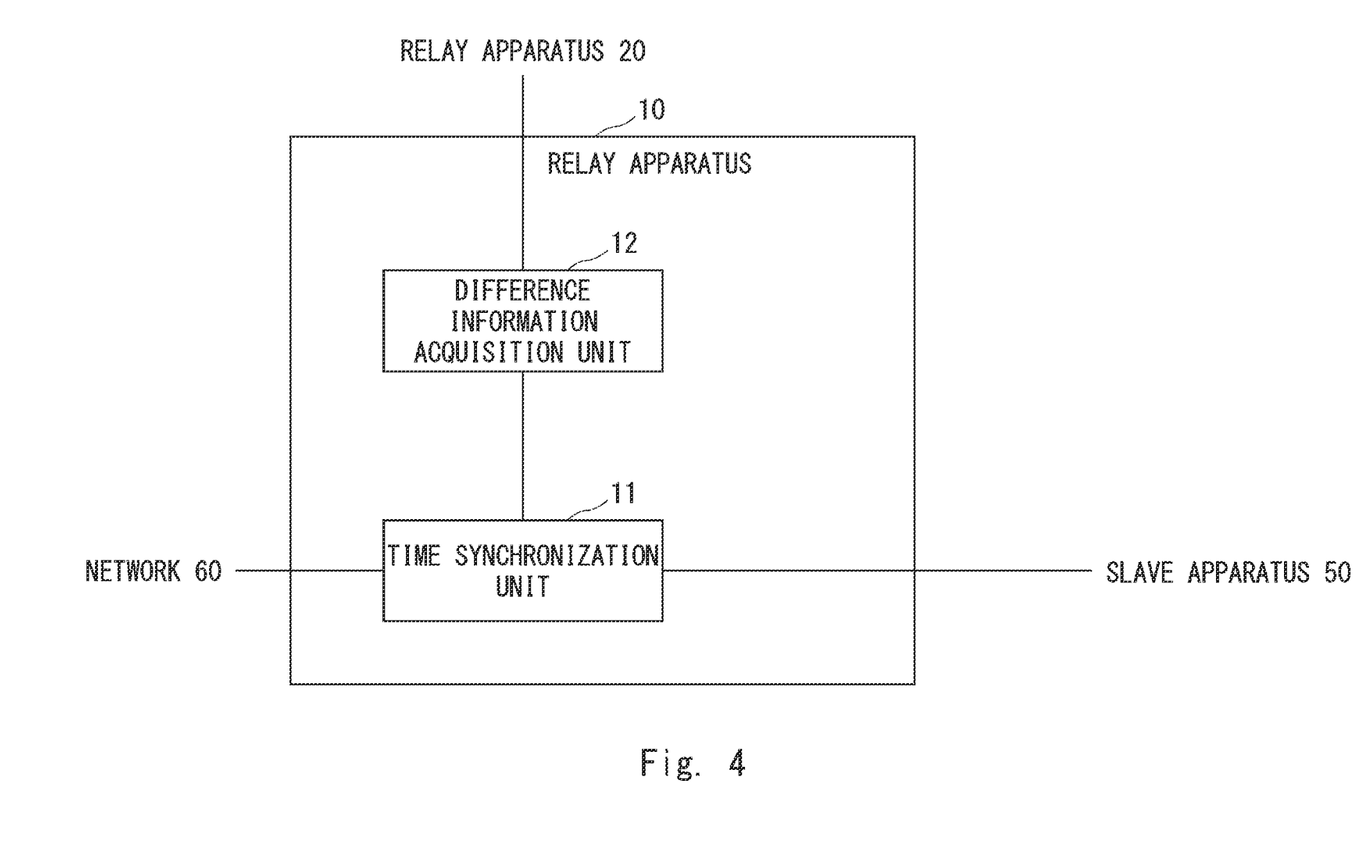
FIG. 4 is a diagram showing a configuration of the relay apparatus according to the second example embodiment.

Next, an example of a configuration of the relay apparatus 10 according to the second example embodiment will be described with reference to FIG. 4. The relay apparatus 10 includes a time-synchronization unit 11 and a difference-information acquisition unit 12. Each of the time-synchronization unit 11 and the difference-information acquisition unit 12 may be software or a module by which processing is performed as a processor executes a program stored in a memory. Alternatively, each of the time-synchronization unit 11 and the difference-information acquisition unit 12 may be hardware such as a circuit or a chip.

The time-synchronization unit 11 performs time-synchronization with the master apparatus 30 through the transmission system 60. The time-synchronization unit 11 operates as a PTP slave, and the master apparatus 30 operates as a PTP master.

Further, the time-synchronization unit 11 also performs time-synchronization with the relay apparatus 20. In this case, the time-synchronization unit 11 operates as a PTP master, and the relay apparatus 20 operates as a PTP slave. When the time-synchronization unit 11 performs time-synchronization with the relay apparatus 20, it transmits information about a time that was obtained as a result of the time-synchronization with the master apparatus 30 to the relay apparatus 20. The time-synchronization unit 11 performs time-synchronization with the relay apparatus 20 by using the information about the time that was obtained as a result of the time-synchronization with the master apparatus 30.

The difference-information acquisition unit 12 acquires difference information from the relay apparatus 20. The difference information indicates a difference between time information that is obtained as the relay apparatus 20 performs time-synchronization with the relay apparatus 10 and time information received from the GNSS receiver 41. That is, the difference information indicates a difference between the time information that is obtained as the relay apparatus 10 performs time-synchronization with the transmission system 60 and the accurate time information indicated by the GNSS receiver 41. The difference-information acquisition unit 12 outputs the difference information to the time-synchronization unit 11.

The time-synchronization unit 11 corrects the time information obtained by performing time-synchronization with the master apparatus 30 by using the difference information acquired from the difference-information acquisition unit 12. The time-synchronization unit 11 transmits the corrected time information to the slave apparatus 50 and thereby performs time-synchronization with the slave apparatus 51. That is, the slave apparatus 50 synchronizes with the corrected time information in the relay apparatus 10. The time-synchronization unit 11 operates as a PTP master, and the slave apparatus 50 operates as a PTP slave.

Figure 5:
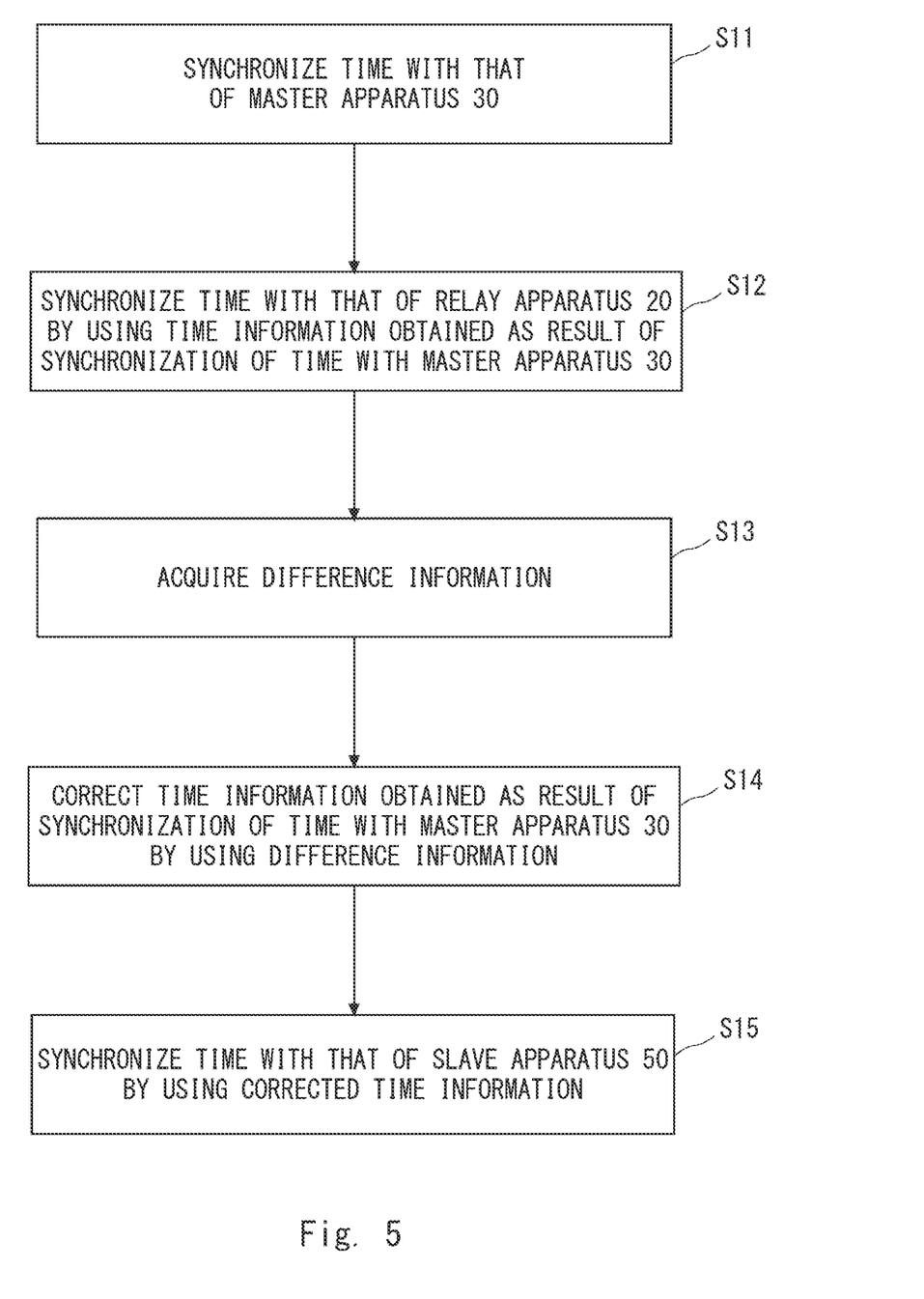
FIG. 5 shows a flow of a time-synchronization process according to the second example embodiment.

Next, a flow of a time-synchronization process performed in the relay apparatus 10 will be described with reference to FIG. 5. Firstly, the time-synchronization unit 11 performs time-synchronization with the master apparatus 30 through the transmission system 60 (S11). The transmission system 60 causes an asymmetric delay. Therefore, a one-way transmission delay D calculated by the master apparatus 30 differs from the actual transmission delay D1 of the synchronization packet transmitted from the master apparatus 30 to the relay apparatus 10. Note that a transmission delay error D2 is expressed as "D2=D−D1". That is, the time information that is obtained as the relay apparatus 10 performs time-synchronization with the master apparatus 30 through the transmission system 60 is deviated from the time information of the master apparatus 30 by the transmission delay error D2.

Next, the time-synchronization unit 11 performs time-synchronization with the relay apparatus 20 by using the time information that was obtained as a result of the time-synchronization with the master apparatus 30 (S12). The relay apparatus 10 operates as a PTP master, and the relay apparatus 20 operates as a PTP slave. It is assumed that no asymmetric delay occurs between the relay apparatus 10 and the relay apparatus 20. In this case, the time information of the relay apparatus 10 substantially coincides with the time information of the relay apparatus 20. That is, the time information of the relay apparatus 20 is also deviated from the time information of the master apparatus 30 by the transmission delay error D2 as in the case of the time information of the relay apparatus 10.

Next, the difference-information acquisition unit 12 acquires difference information from the relay apparatus 20 (S13). The difference information indicates a difference between the time information that was obtained as a result of the time-synchronization that the relay apparatus 20 performed with relay apparatus 10 and the time information that the relay apparatus 20 obtained from the GNSS receiver 41.

Since the master apparatus 30 also uses the time information obtained from the GNSS receiver 71, it is considered that the time information that the relay apparatus 20 obtained from the GNSS receiver 41 substantially coincides with the time information of the master apparatus 30. That is, since the difference information indicates the difference between the time information of the master apparatus 30 and the time information that was obtained as a result of the time-synchronization that the relay apparatus 10 performed with relay apparatus 20, the difference information has a value equal or close to the transmission delay error D2.

Next, the time-synchronization unit 11 corrects the time information obtained as a result of the time-synchronization with the master apparatus 30 by using the difference information (S14). For example, the time-synchronization unit 11 eliminates or cancels out the transmission delay error D2 by adding or subtracting the difference information to or from the time information obtained as a result of the time-synchronization with the master apparatus 30.

Next, the time-synchronization unit 11 performs time-synchronization with the slave apparatus 50 by using the corrected time information obtained in the step S14 (S15).

Note that it is assumed that the time-synchronization unit 11 does not perform time-synchronization with the relay apparatus 20 by using the corrected time information obtained in the step S14. The relay apparatus 20 corrects the time information that was obtained as a result of the time-synchronization with the relay apparatus 10 by using the difference information, and performs time-synchronization with the slave apparatus 51. The relay apparatus 20 may use one and the same value as the difference information over a predetermined period. In such a situation, if the relay apparatus 20 applies the difference information to the time information of the relay apparatus 10 in which the transmission delay error D2 has been cancelled out, a deviation from the time of the master apparatus 30 occurs again. Therefore, the time-synchronization unit 11 corrects only the time information used for the time-synchronization with the slave apparatus 51 by using the difference information.

Next, a flow of a time-synchronization process performed in the relay apparatus 20 will be described with reference to FIG. 6. Firstly, the time-synchronization unit 21 performs time-synchronization with the relay apparatus 10 (S21). The time information in the relay apparatus 10 deviates from the time information of the master apparatus 30 by the transmission delay error D2. Therefore, the time information that was obtained as a result of the time-synchronization that the relay apparatus 20 performed with relay apparatus 10 while operating as a PTP slave also deviates from the time information of the master apparatus 30 by the transmission delay error D2.

Next, the difference-information generation unit 22 calculates a difference between the time information obtained as a result of the time-synchronization with the relay apparatus 10 and the time information obtained from the GNSS receiver 41 (S22).

Next, the time-synchronization unit 21 transmits the difference information to the relay apparatus 10 (S23).

Next, the time-synchronization unit 21 corrects the time information obtained as a result of the time-synchronization with the relay apparatus 10 by using the difference information (S24). For example, the time-synchronization unit 21 eliminates the transmission delay error D2 by adding or subtracting the difference information to or from the time information obtained as a result of the time-synchronization with the relay apparatus 10.

Next, the time-synchronization unit 21 performs time-synchronization with the slave apparatus 51 by using the corrected time information obtained in the step S24 (S25).

Figure 6:
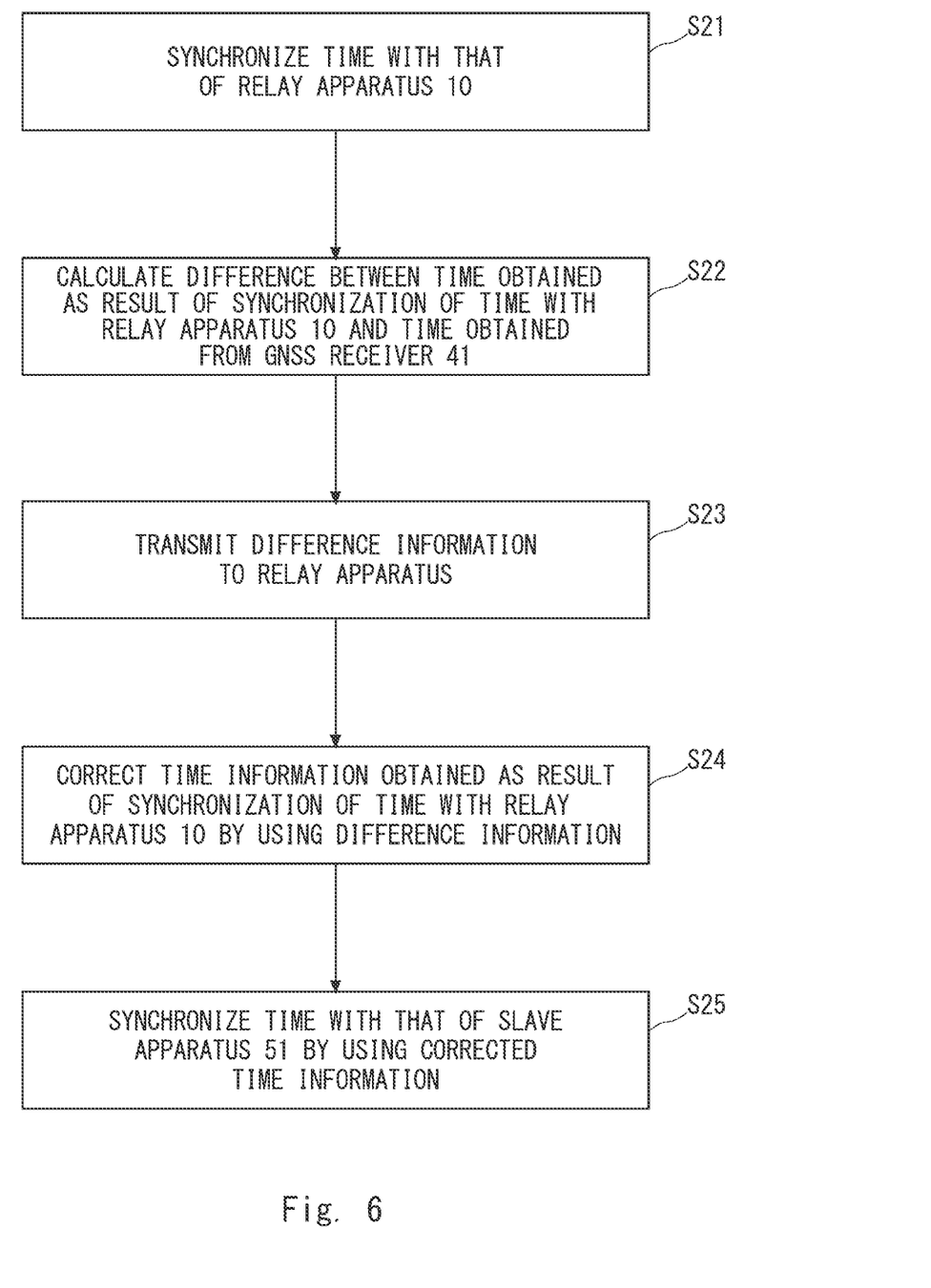
FIG. 6 shows a flow of the time-synchronization process according to the second example embodiment.

In FIG. 6, a flow of processes in which the steps S24 and S25 are performed after the step S23 has been described. However, the process in the step S23 may be performed after the steps S24 and S25. Alternatively, the process in the step S23 may be performed at substantially the same timing as the processes in the steps S24 and S25.

As described above, in the time-synchronization system according to the second example embodiment, the relay apparatus 20 can eliminate the transmission delay error D2, which is caused because the relay apparatus 10 performs time-synchronization by using the transmission system 60. Further, the relay apparatus 10 can cancel out the transmission delay error D2, which is caused because it performs time-synchronization by using the transmission system 60, by acquiring the difference information from the relay apparatus 20. As a result, it is possible to improve the accuracy of the time-synchronization with the master apparatus 30 in the slave apparatus 50 and the slave apparatus 51 which communicate with the relay apparatus 10 and the relay apparatus 20, respectively.

Third Example Embodiment

Figure 7:
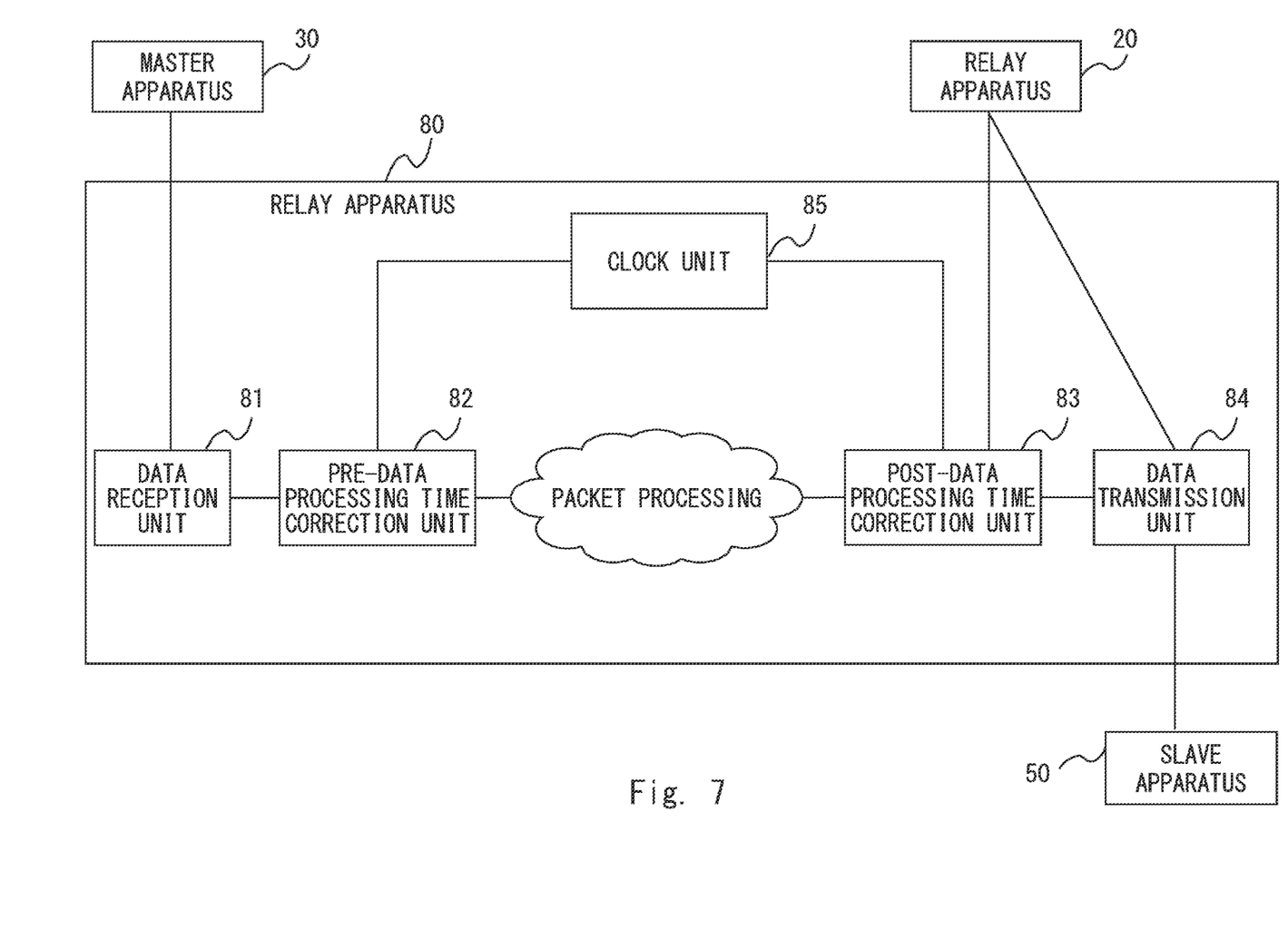
FIG. 7 is a diagram showing a configuration of a relay apparatus according to a third example embodiment.

Next, an example of a configuration of a relay apparatus 80 according to a third example embodiment will be described with reference to FIG. 7. The relay apparatus 80 is used in place of the relay apparatus 20 in the time-synchronization system shown in FIG. 2. The relay apparatus 80 operates as a transparent clock apparatus.

The relay apparatus 80 includes a data reception unit 81, a pre-data processing time correction unit 82, a post-data processing time correction unit 83, a data transmission unit 84, and a clock unit 85. Each of the data reception unit 81, the pre-data processing time correction unit 82, the post-data processing time correction unit 83, the data transmission unit 84, and the clock unit 85 may be software or a module by which processing is performed as a processor executes a program stored in a memory. Alternatively, each of the data reception unit 81, the pre-data processing time correction unit 82, the post-data processing time correction unit 83, the data transmission unit 84, and the clock unit 85 may be hardware such as a circuit or a chip.

The data reception unit 81 receives a synchronization packet transmitted from the master apparatus 30 through the transmission system 60. The data reception unit 82 outputs the received synchronization packet to the pre-data processing time correction unit 82.

Figure 8:
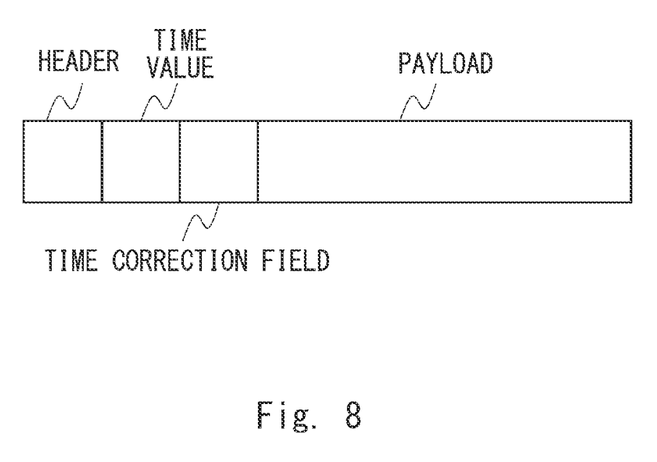
FIG. 8 is a diagram showing a structure of a synchronization packet according to the third example embodiment.

Note that an example of a structure of the synchronization packet will be described with reference to FIG. 8. The synchronization packet transmitted from the master apparatus 30 to the relay apparatus 80 includes a header, a payload, a time field, and a time correction field. The header and the payload are a header and a payload in a commonly used frame or a commonly used packet, and therefore detailed descriptions thereof are omitted. The time field and the time correction field may be defined, for example, as a part(s) of a header, or may be defined as a part(s) of normal data contained in a payload.

In the time field, for example, a time value indicating a time at which the master apparatus 30 transmitted a synchronization packet is set. Further, in the time correction field, a time correction value for correcting, for example, a transmission delay of a synchronization packet in a packet network, a processing delay in each relay apparatus, or the like is set.

Referring to FIG. 7 again, the pre-data processing time correction unit 82 extracts the time correction value set in the time correction field of the synchronization packet. The pre-data processing time correction unit 82 updates the time correction field by subtracting information indicating a time at which the synchronization packet was received from the extracted time correction value. The time at which synchronization packet was received is determined based on an internal clock managed by the clock unit 85. The time at which the synchronization packet was received may be, for example, a time at which the pre-data processing time correction unit 82 received the synchronization packet from the data reception unit 82.

The pre-data processing time correction unit 82 outputs the synchronization packet, in which the time correction field has been updated, to a circuit, a function block, or the like that performs data processing. The functional block provides, for example, a function by which processing is performed as a processor executes a program. The functional block may be, for example, a packet switch function or the like. The circuit, the functional block, or the like that performs data processing may perform, for example, processing for controlling the transmission path or the like of the synchronization packet in a packet network. Alternatively, the circuit, the functional block, or the like that performs data processing may perform processing of information set in other packet layers or processing of information set in a layer higher than the packet layer. The data processing may also be referred to, for example, as packet processing.

The synchronization packet, for which data processing has been performed in the circuit or the like that performs data processing, is output to the post-data processing time correction unit 83. The post-data processing time correction unit 83 extracts a time correction value set in the time correction field of the output synchronization packet. The post-data processing time correction unit 83 updates the time correction field by adding information indicating a time at or later than the execution of the data processing of the synchronization packet to the extracted time correction value. The time at or later than the execution of the data processing of the synchronization packet is determined based on the internal clock managed by the clock unit 85.

The time at or later than the execution of the data processing of the synchronization packet may be, for example, a time at which the post-data processing time correction unit 83 received the synchronization packet for which the data processing has been performed.

The post-data processing time correction unit 83 outputs the synchronization packet, in which the time correction field has been updated, to the data transmission unit 84. The data transmission unit 84 transmits the synchronization packet output from the post-data processing time correction unit 83 to the slave apparatus 50.

Note that the post-data processing time correction unit 83 acquires difference information from the relay apparatus 20. The post-data processing time correction unit 83 corrects a value in the time correction field by using the difference information. That is, the post-data processing time correction unit 83 updates the time correction field by adding information indicating the time at or later than the execution of the data processing of the synchronization packet to the extracted time correction value, and then corrects the value in the time correction field by using the difference information. Effects that are obtained by correcting the value in the time correction field by using the difference information will be described hereinafter.

In the third example embodiment, the relay apparatus 20 performs time-synchronization with the master apparatus 30 through the relay apparatus 80 and the transmission system 60. That is, the master apparatus 30 operates as a PTP master, and the relay apparatus 20 operates as a PTP slave. Note that since the transmission system 60 causes an asymmetric delay, the time information that is obtained as the relay apparatus 20 performs time-synchronization with the master apparatus 30 contains a transmission delay error as compared to the time information of the master apparatus 30. The difference information has a value indicating a difference between the time information that is obtained as the relay apparatus 20 performs time-synchronization with the master apparatus 30 and the time information obtained from the GNSS receiver 41. That is, the difference information has a value that is substantially equal to the transmission delay error.

Further, in the third example embodiment, the slave apparatus 50 performs time-synchronization with the master apparatus 30 through the relay apparatus 80 and the transmission system 60. That is, the master apparatus 30 operates as a PTP master, and the slave apparatus 50 operates as a PTP slave. Note that the time information that is obtained as the slave apparatus 50 performs time-synchronization with the master apparatus 30 has a deviation equal or close to that in the relay apparatus 20.

Therefore, the post-data processing time correction unit 83 corrects the value in the time correction field by adding or subtracting the difference information to or from the value in the time correction field. In this way, it is possible to cancel out the deviation occurring in the time information that is obtained as the slave apparatus 50 performs time-synchronization with the master apparatus 30.

Further, the post-data processing time correction unit 83 corrects only the value in the time correction field of the synchronization packet that is transmitted to the slave apparatus 50 by using the difference information. That is, the post-data processing time correction unit 83 does not correct the value in the time correction field of the synchronization packet that is transmitted to the relay apparatus 20 by using the difference information.

As described above, in the time-synchronization system according to the third example embodiment, the relay apparatus 20 can cancel out the transmission delay error which is caused because the relay apparatus 20 performs time-synchronization by using the transmission system 60. Further, the relay apparatus 80 can correct, by using the difference information acquired from the relay apparatus 20, the time correction field of the synchronization packet so that the transmission delay error, which is caused because the relay apparatus 80 performs time-synchronization by using the transmission system 60, can be cancelled out. As a result, it is possible to improve the accuracy of the time-synchronization with the master apparatus 30 in the slave apparatus 50 and the slave apparatus 51 which communicate with the relay apparatus 80 and the relay apparatus 20, respectively.

Figure 9:
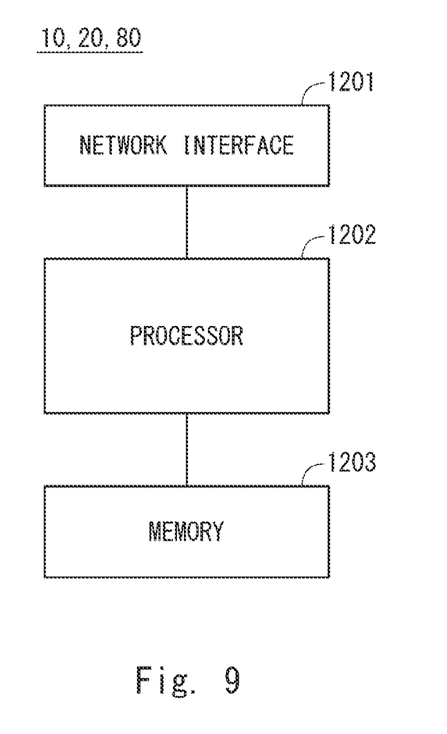
FIG. 9 is a diagram showing a configuration of a relay apparatus according to each example embodiment.

FIG. 9 is a block diagram showing an example of a configuration of each of the relay apparatus 10, the relay apparatus 20, and the relay apparatus 80 (hereinafter, referred to as the relay apparatus 10 or the like). As shown in FIG. 9, the relay apparatus 10 or the like includes a network interface 1201, a processor 1202, and a memory 1203. The network interface 1201 is used to communicate with network nodes (e.g., an eNB, an MME, and a P-GW). The network interface 1201 may include, for example, a network interface card (NIC) in conformity with IEEE 802.3 series.

The processor 1202 performs processes performed by the relay apparatus 10 and the like explained above with reference to a flowchart in the above-described example embodiments by loading software (a computer program) from the memory 1203 and executing the loaded software. The processor 1202 may be, for example, a microprocessor, an MPU, or a CPU. The processor 1202 may include a plurality of processors.

The memory 1203 is formed by a combination of a volatile memory and a nonvolatile memory. The memory

1203 may include a storage disposed remotely from the processor 1202. In this case, the processor 1202 may access the memory 1203 through an I/O interface (not shown).

In the example shown in FIG. 9, the memory 1203 is used to store a group of software modules. The processor 1202 can perform processes performed by the relay apparatus 10 or the like explained above in the above-described example embodiments by loading the group of software modules from the memory 1203 and executing the loaded software modules.

As explained above with reference to FIG. 9, each of the processors included in the relay apparatus 10 and the like in the above-described example embodiments executes one or a plurality of programs including a group of instructions for causing a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (e.g., floppy disks, magnetic tapes, hard disk drives, etc.), optical magnetic storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a radio communication line.

Note that the present invention is not limited to the above-described example embodiments, and they may be modified as appropriate without departing from the spirit and scope of the invention.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2019-064688, filed on Mar. 28, 2019, the disclosure of which is incorporated herein in its entirety by reference.

The whole or part of the example embodiments disclosed above can be described as, but not limited to, the following supplementary notes.

(Supplementary Note 1)

A time-synchronization system comprising:

a first relay apparatus configured to perform time-synchronization with a master apparatus through a transmission system of which a transmission delay changes depending on a transmission direction; and a second relay apparatus configured to perform time-synchronization with the first relay apparatus, wherein the second relay apparatus transmits information about a difference between first time information obtained by performing time-synchronization with the first relay apparatus and second time information obtained from a time-synchronization source to the first relay apparatus, and the first relay apparatus corrects third time information obtained by performing time-synchronization with the master apparatus by using the information about the difference, and performs time-synchronization with a slave apparatus by using the corrected third time information.

(Supplementary Note 2)

The time-synchronization system described in Supplementary note 1, wherein the first relay apparatus performs time-synchronization with the second relay apparatus by using the third time information without making a correction thereto by using the difference information.

(Supplementary Note 3)

The time-synchronization system described in Supplementary note 1 or 2, wherein transmission delays between the first and second relay apparatuses in both directions are equal to each other.

(Supplementary Note 4)

The time-synchronization system described in any one of Supplementary notes 1 to 3, wherein the time-synchronization source is a satellite positioning system.

(Supplementary Note 5)

The time-synchronization system described in any one of Supplementary notes 1 to 4, wherein the first relay apparatus operates as a boundary clock apparatus.

(Supplementary Note 6)

A time-synchronization system comprising:

a second relay apparatus configured to perform time-synchronization with a master apparatus through a transmission system of which a transmission delay changes depending on a transmission direction; and a first relay apparatus configured to relay a synchronization packet transmitted between the master apparatus and the second relay apparatus, wherein the second relay apparatus transmits, to the first relay apparatus, information about a difference between first time information obtained by performing time-synchronization with the master apparatus and second time information obtained from the time-synchronization source, and the first relay apparatus updates a value in a correction field of the synchronization packet by using the information about the difference.

(Supplementary Note 7)

The time-synchronization system described in Supplementary note 6, wherein the time-synchronization source is a satellite positioning system.

(Supplementary Note 8)

The time-synchronization system described in Supplementary note 7, wherein the first relay apparatus operates as a transparent clock apparatus.

(Supplementary Note 9)

A relay apparatus comprising:

a time-synchronization unit configured to perform time-synchronization with a first relay apparatus, the first relay apparatus being configured to perform time-synchronization with a master apparatus through a transmission system of which a transmission delay changes depending on a transmission direction; and a difference-information generation unit configured to generate information about a difference between first time information obtained by performing time-synchronization with the first relay apparatus and second time information obtained from a time-synchronization source, wherein the time-synchronization unit transmits the information about the difference to the first relay apparatus in order to make the first relay apparatus correct third time information obtained by performing time-synchronization with the master apparatus in the first relay apparatus.

(Supplementary Note 10)
the relay apparatus described in supplementary note 9, wherein transmission delays between the first relay apparatus and the relay apparatus in both directions are equal to each other.

(Supplementary Note 11)
a relay apparatus comprising:
a time-synchronization unit configured to perform time-synchronization with a master apparatus through a transmission system of which a transmission delay changes depending on a transmission direction; and
a difference-information acquisition unit configured to acquire, from a second relay apparatus configured to further perform time-synchronization, information about a difference between first time information that is obtained as the time-synchronization is performed in the second relay apparatus and second time information obtained from the time-synchronization source, wherein
the time-synchronization unit corrects the third time information obtained by performing time-synchronization with the master apparatus by using the information about the difference, and performs time-synchronization with a slave apparatus by using the corrected third time information.

(Supplementary Note 12)
The relay apparatus described in Supplementary note 11, wherein the time-synchronization unit performs time-synchronization with the second relay apparatus by using the third time information without making a correction thereto by using the difference information.

(Supplementary Note 13)
A time-synchronization method performed in a relay apparatus, comprising:
performing time-synchronization with a first relay apparatus, the first relay apparatus being configured to perform time-synchronization with a master apparatus through a transmission system of which a transmission delay changes depending on a transmission direction;
generating information about a difference between first time information obtained by performing time-synchronization with the first relay apparatus and second time information obtained from a time-synchronization source; and
transmitting the information about the difference to the first relay apparatus in order to make the first relay apparatus correct third time information obtained by performing time-synchronization with the master apparatus in the first relay apparatus.

(Supplementary Note 14)
A time-synchronization method performed in a relay apparatus, comprising:
performing time-synchronization with a master apparatus through a transmission system of which a transmission delay changes depending on a transmission direction;
acquiring, from a second relay apparatus configured to further perform time-synchronization, information about a difference between first time information that is obtained as the time-synchronization is performed in the second relay apparatus and second time information obtained from a time-synchronization source;
correcting third time information obtained by performing time-synchronization with the master apparatus by using the information about the difference; and
performing time-synchronization with a slave apparatus by using the corrected third time information.

(Supplementary Note 15)
A program for causing a computer to:
performing time-synchronization with a first relay apparatus, the first relay apparatus being configured to perform time-synchronization with a master apparatus through a transmission system of which a transmission delay changes depending on a transmission direction;
generate information about a difference between first time information obtained by performing time-synchronization with the first relay apparatus and second time information obtained from a time-synchronization source; and
transmit the information about the difference to the first relay apparatus in order to make the first relay apparatus correct third time information obtained by performing time-synchronization with the master apparatus in the first relay apparatus.

(Supplementary Note 16)
A program for causing a computer to:
performing time-synchronization with a master apparatus through a transmission system of which a transmission delay changes depending on a transmission direction;
acquire, from a second relay apparatus configured to further perform time-synchronization, information about a difference between first time information that is obtained as the time-synchronization is performed in the second relay apparatus and second time information obtained from a time-synchronization source;
correct third time information obtained by performing time-synchronization with the master apparatus by using the information about the difference; and
performing time-synchronization with a slave apparatus by using the corrected third time information.

REFERENCE SIGNS LIST

10 RELAY APPARATUS
11 TIME SYNCHRONIZATION UNIT
12 DIFFERENCE INFORMATION ACQUISITION UNIT
20 RELAY APPARATUS
21 TIME SYNCHRONIZATION UNIT
22 DIFFERENCE INFORMATION GENERATION UNIT
30 MASTER APPARATUS
40 TIME SYNCHRONIZATION SOURCE
41 GNSS RECEIVER
42 GNSS SATELLITE
50 SLAVE APPARATUS
51 SLAVE APPARATUS
60 TRANSMISSION SYSTEM
71 GNSS RECEIVER
72 GNSS SATELLITE
80 RELAY APPARATUS
81 DATA RECEIVING UNIT
82 PRE-DATA PROCESSING TIME CORRECTION UNIT
83 POST-DATA PROCESSING TIME CORRECTION UNIT
84 DATA TRANSMISSION UNIT
85 CLOCK UNIT
1201 NETWORK INTERFACES
1202 PROCESSOR
1203 MEMORY

What is claimed is:
1. A time-synchronization system comprising:
a first relay apparatus configured to perform time-synchronization with a master apparatus through a transmission system of which a transmission delay changes depending on a transmission direction; and
a second relay apparatus configured to perform time-synchronization with the first relay apparatus, wherein the second relay apparatus comprises;
  at least one memory storing instructions, and
  at least one processor configured to execute the instructions to;
transmit information about a difference between first time information obtained by performing time-synchronization with the first relay apparatus and second time information obtained from a time-synchronization source to the first relay apparatus,
wherein the first relay apparatus comprises;
  at least one memory storing instructions, and
  at least one processor configured to execute the instructions to;
correct third time information obtained by performing time-synchronization with the master apparatus by using the information about the difference, and perform time-synchronization with a slave apparatus by using the corrected third time information.

2. The time-synchronization system according to claim 1, wherein the at least one processor of the first relay apparatus is further configured to perform time-synchronization with the second relay apparatus by using the third time information without making a correction thereto by using the difference information.

3. The time-synchronization system according to claim 1, wherein transmission delays between the first and second relay apparatuses in both directions are equal to each other.

4. The time-synchronization system according to claim 1, wherein the time-synchronization source is a satellite positioning system.

5. The time-synchronization system according to claim 1, wherein the first relay apparatus operates as a boundary clock apparatus.

6. A relay apparatus comprising:
  at least one memory storing instructions, and
  at least one processor configured to execute the instructions to;
    perform time-synchronization with a first relay apparatus, the first relay apparatus being configured to perform time-synchronization with a master apparatus through a transmission system of which a transmission delay changes depending on a transmission direction; and
    generate information about a difference between first time information obtained by performing time-synchronization with the first relay apparatus and second time information obtained from a time-synchronization source, and
    transmit the information about the difference to the first relay apparatus in order to make the first relay apparatus correct third time information obtained by performing time-synchronization with the master apparatus in the first relay apparatus.

7. The relay apparatus according to claim 6, wherein transmission delays between the first relay apparatus and the relay apparatus in both directions are equal to each other.

8. A time-synchronization method performed in a relay apparatus, comprising:
  performing time-synchronization with a first relay apparatus, the first relay apparatus being configured to perform time-synchronization with a master apparatus through a transmission system of which a transmission delay changes depending on a transmission direction;
  generating information about a difference between first time information obtained by performing time-synchronization with the first relay apparatus and second time information obtained from a time-synchronization source; and
  transmitting the information about the difference to the first relay apparatus in order to make the first relay apparatus correct third time information obtained by performing time-synchronization with the master apparatus in the first relay apparatus.

\* \* \* \* \*